US007930542B2

(12) United States Patent
Ganesan (10) Patent No.: US 7,930,542 B2
(45) Date of Patent: Apr. 19, 2011

(54) MASHSSL: A NOVEL MULTI PARTY AUTHENTICATION AND KEY EXCHANGE MECHANISM BASED ON SSL (75) Inventor: Ravi Ganesan, Half Moon Bay, CA (US)

(73) Assignee: Safemashups Inc., San Antonio, TX (US)

( * ) Notice: Subject to any disclaimer, the term of this patent is extended or adjusted under 35 U.S.C. 154(b) by 567 days.

(21) Appl. No.: 12/098,754

(22) Filed: Apr. 7, 2008

(65) Prior Publication Data

US 2010/0005297 A1 Jan. 7, 2010

(51) Int. Cl.
*H04L 9/00* (2006.01)
*G06F 7/04* (2006.01)
*G06F 17/30* (2006.01)

(52) U.S. Cl. ........ 713/169; 713/170; 713/171; 713/172; 713/173; 713/174; 726/27; 726/28; 726/29; 726/30

(58) Field of Classification Search .................... 713/169
See application file for complete search history.

(56) References Cited

U.S. PATENT DOCUMENTS

| 5,315,658 | A | 5/1994 | Micali |
| 5,657,390 | A | 8/1997 | Elgamal et al. |
| 6,141,750 | A | 10/2000 | Micali |
| 6,212,635 | B1 | 4/2001 | Reardon |
| 6,367,009 | B1 | 4/2002 | Davis et al. |
| 6,751,677 | B1 * | 6/2004 | Ilnicki et al. .................. 719/316 |
| 7,020,688 | B2 | 3/2006 | Sykes, Jr. |
| 7,318,238 | B2 | 1/2008 | Elvanoglu et al. |
| 2003/0140226 | A1 | 7/2003 | Yamamoto et al. |
| 2003/0182423 | A1 | 9/2003 | Shafir et al. |
| 2004/0103283 | A1 | 5/2004 | Hornak |
| 2005/0086197 | A1 | 4/2005 | Boubez et al. |
| 2006/0080352 | A1 | 4/2006 | Boubez et al. |
| 2007/0289006 | A1 | 12/2007 | Ramachandran et al. |
| 2008/0046984 | A1 | 2/2008 | Bohmer et al. |

OTHER PUBLICATIONS

SSL-over-SOAP: Towards a Token-based Key Establishment Framework for Web Services, Sebastian Gajek, Lijun Liao, Bodo Möller and Jörg Schwenk, IEEE ECOWS Workshop on Emerging Web Services Technology (WEWST'07), Halle (Germany), 2007.

* cited by examiner

*Primary Examiner* — Longbit Chai
(74) *Attorney, Agent, or Firm* — Sughrue Mion, PLLC (57) ABSTRACT The present invention provides a method that allows three parties to mutually authenticate each other and share an encrypted channel. The invention is based on a novel twist to the widely used two party transport level SSL protocol. One party, typically a user at a browser, acts as a man in the middle between the other two parties, typically two web servers with regular SSL credentials. The two web servers establish a standard mutually authenticated SSL connection via the user's browser, using a novel variation of the SSL handshake that guarantees that a legitimate user is in the middle.

13 Claims, 9 Drawing Sheets

FIGURE 1

SSL

- Set-Up: Two web servers with regular SSL certificates.

- Handshake:

- At end of handshake both servers are mutually authenticated.
- All further communication after handshake is encrypted with secret.

```
MashSSL-Handshake-XML1
<?xml version="1.0" encoding="UTF-8"?>
<mashssl-handshake-1 version = "1.0">

<ssl-handshake-1-client-hello>
                <ssl-session-id>
                <random>
                        <gmt-unix-time>
                        <ssl-client-hello-random>  //May be scrambled
                </random>
                <ciphersuites>
                </ciphersuites>
                <compression-list>
                </compression-list>
        </ssl-handshake-1-client-hello>

<mashssl-additions-1>
                <mashssl-principals>
                        <mashssl-user-id>  //unique to this user
                        <mashssl-client-name>
                        <mashssl-server-name>
                </mashssl-principals>
                <mashssl-user-client-random>  //also scrambled; used to derive mashssl-user-client-key//
                <client-certificate>  //May be different from the SSL certificate
                <scramble-options>
                        <scrambling-on>  //TRUE or FALSE
                        <high-entropy-scrambling-key>  //TRUE or FALSE
                        <authentication-information>  //PASSWORD, OTP, OOB, PKI, SC
                        <using-cached-key-at-user>  //TRUE or FALSE
                </scramble-options>
                <scramble-options-requested-of-other-server>
                        <request-scrambling-on>  //MUST-HAVE, PREFERRED, DONT-CARE
                        <request-high-entropy-user-key>//MUST-HAVE, PREFERRED, DONT-CARE
                        <request-authentication-information>//ordered list
                        <request-using-cached-key-at-user>//MUST-HAVE, PREFERRED, DONT-CARE
                </scramble-options-requested-of-other-server>
        </mashssl-additions-1>
</mashssl-handshake-1>
```

FIGURE 4

MashSSL-Message-2
<?xml version="1.0" encoding="UTF-8"?>
<mashssl-handshake-2 version = "1.0">

<ssl-handshake-2-server-hello>
        <ssl-session-id> //Fresh session-id, unless reusing existing parameters //
        <random>
            <gmt-unix-time>
            <ssl-serverhello-random> //Tag, or tag/value scrambled, if scrambling is on //
        </random>
        <ciphersuite>
        <compression-choice>
        <server-certificate>
        <certificate-request>
    </ssl-handshake-2-server-hello>

<mashssl-additions-2>
        <mashssl-principals>
            <mashssl-user-id>
            <mashssl-client-name>
            <mashssl-server-name>
        </mashssl-principals>
        <server-certificate>
        <mashssl-low-entropy-scrambling-verify> //e.g. Validation of correct password entry//
        <mashssl-user-server-random> //used to derive mashssl-user-server-key//
        <scramble-options>
            <scrambling-on> //TRUE or FALSE //
            <high-entropy-scrambling-key> //TRUE or FALSE//
            <authentication-information> //PASSWORD, OTP, OOB, PKI, SC //
            <using-cached-key-at-user> //TRUE or FALSE //
        </scramble-options>
    </mashssl-additions-1>

</mash-ssl-handshake-2>

FIGURE 5

MashSSL-Handshake-3XML
```xml
<?xml version="1.0" encoding="UTF-8"?>
<mashssl-handshake-3 version = "1.0">

<ssl-handshake-3-client-key-exchange>
                <ssl-session-id>
                <client-certificate>
                <client-key-exchange> //pre-master-secret encrypted with server public key//
                <certificate-verify> //rhash signed with client private key //
                <Finished>
        </ssl-handshake-3-client-key-exchange>

<mashssl-additions-3>
                <mashssl-principals>
                        <mashssl-user-id>
                        <mashssl-client-name>
                        <mashssl-server-name>
                </mashssl-principals>
                <mashssl-data-for-user> //data encrypted with  mashssl-user-client-key//
                <mashssl-data-for server> //data encrypted with master-secret//

</mashssl-additions-3>

</ mashssl-handshake-3>
```

FIGURE 6

MashSSL-Handshake-XML4
<?xml version="1.0" encoding="UTF-8"?>
<mashssl-handshake-4 version = "1.0">

<ssl-handshake-4-server-finished>
        <ssl-session-id>
        <Finished>
    </ssl-handshake-4-server-finished>

<mashssl-additions-4>
        <mashssl-principals>
            <mashssl-user-id>
            <mashssl-client-name>
            <mashssl-server-name>
        </mashssl-principals>
        <mashssl-data-for-user> //data encrypted with  mashssl-user-server-key//
        <mashssl-data-for client> //data encrypted with master-secret//
    </mashssl-additions-4>

</ mashssl-handshake-4>

FIGURE 7

MashSSL-Application-Data-XML
<?xml version="1.0" encoding="UTF-8"?>
<mashssl-application-data version = "1.0">
    <ssl-session-id>
    <mashssl-direction-origin> //CLIENT or SERVER//
    <mashssl-principals>
        <mashssl-user-id>
        <mashssl-client-name>
        <mashssl-server-name>
    </mashssl-principals>
    <mashssl-data-for-user> //data encrypted with mashssl-user-client or server-key//
    <mashssl-data-for-other-server> //data encrypted with master-secret//
<mashssl-application-data>

FIGURE 8

MashSSL-Handshake-XML2abbreviated
<?xml version="1.0" encoding="UTF-8"?>
<mashssl-handshake-2abbreviated version = "1.0">

<ssl-handshake-2-server-hello>
        <ssl-session-id> //Same session-id as in ssl-handshake-1-client-hello //
        <random>
            <gmt-unix-time>
            <ssl-serverhello-random>
        </random>
        <Finished>
    </ssl-handshake-2-server-hello>

<mashssl-additions-2>
        <mashssl-principals>
            <mashssl-user-id>
            <mashssl-client-name>
            <mashssl-server-name>
        </mashssl-principals>
        <server-certificate>
        <mashssl-user-server-random> //used to derive mashssl-user-server-key//
        <mashssl-low-entropy-scrambling-verify>  //e.g. Validation of correct password
        <scramble-options>
            <scrambling-on> //TRUE or FALSE //
            <high-entropy-scrambling-key> //TRUE or FALSE//
            <authentication-information> //PASSWORD, OTP, OOB, PKI, SC //
            <using-cached-key-at-user> //TRUE or FALSE //
        </scramble-options>
        <mashssl-data-for-user> //data encrypted with mashssl-user-server-key//
        <mashssl-data-for-client> //data encrypted with master-secret//
    </mashssl-additions-1>

</mash-ssl-handshake-2abbreviated>

FIGURE 9

MashSSL-Handshake-XML3abbreviated
<?xml version="1.0" encoding="UTF-8"?>
<mashssl-handshake-3abbreviated version = "1.0">

<ssl-handshake-3-client-key-exchange>
        <ssl-session-id>
        <Finished>
    </ssl-handshake-3-client-key-exchange>

<mashssl-additions-3>
        <mashssl-principals>
            <mashssl-user-id>
            <mashssl-client-name>
            <mashssl-server-name>
        </mashssl-principals>
        <mashssl-data-for-user> //data encrypted with  mashssl-user-client-key//
        <mashssl-data-for server> //data encrypted with master-secret//
    </mashssl-additions-3>

</ mashssl-handshake-3abbreviated>

MASHSSL: A NOVEL MULTI PARTY AUTHENTICATION AND KEY EXCHANGE MECHANISM BASED ON SSL

TECHNICAL FIELD

This invention relates to cryptography. More particularly it relates to mutual authentication and key distribution.

BACKGROUND OF THE INVENTION

Authentication and Man in the Middle Phishing

Many authentication techniques exist which allow an entity (e.g. a user or a web server) to prove its identity to another entity. Often these systems are based on the existence of a shared secret. For instance, revealing knowledge of a shared password is a very common method. Or, one can have 'one time passwords' which are generated based on a shared secret, with both parties having the ability to compute the one time password.

Some systems do not rely on shared secrets, and instead use a technique called public-key cryptography. Here the user proves knowledge of a secret, for instance, by using it to sign a message, but does not reveal the secret itself. The signature is typically verified using information that is unique to the user, but is public. Public key cryptography is typically implemented using a technology called digital certificates. In general, systems based on public key cryptography are considered more secure, but are not as widely used because they are cumbersome (especially for human users; as opposed to computer servers).

Almost all these techniques are vulnerable to the insertion of an attacker in between the legitimate parties. Such an attack is known as a man in the middle (MITM) attack. This has led to the widespread incidence of so-called phishing attacks. Two types of phishing attacks exist, off line and real time. In the off-line case, the MITM simply fools the user into giving up their secret, and at a later time, can enter the password into the legitimate web site. In the on-line case, the man in the middle attacker ferries traffic back and forth in real time. In this case even if the secret is short lived, e.g. a hardware token with a secret number that changes every thirty seconds, the session can be phished. Both such attacks have been widely observed in practice.

It is important to note that the use of stronger techniques like public key cryptography by themselves do not guarantee protection against a man in the middle. Consider a simple example. Assume the web server requires the user to use public key cryptography to sign a fresh challenge in order to authenticate. In this case a real time MITM could simply get the challenge from the web server, transmit that challenge to the user, who will sign it and return it to the MITM, who returns it the legitimate web server. The web server is satisfied and will let the MITM access the system! While this simple use of public key cryptography is easily seen to be insecure, more secure protocols exist which prevent MITMs. For instance the Secure Sockets Layer (SSL) protocol when used with mutual authentication (defined later), can thwart a MITM attacker. While SSL is very widely used, it is rarely used with mutual authentication.

The Secure Sockets Layer Protocol

The SSL protocol (which has been renamed the Transport Layer Security or TLS protocol) is one of the most widely used security protocols on the Internet. As is evident from the name it has been designed to be a two entity protocol most generally used to secure "sockets" (or more generally the "transport layer" in a communication protocol). For instance, on the Internet, which uses TCP/IP, SSL is used to take a "TCP socket" between two entities and make it a "secure socket". Once such a "secure socket" has been established, application level protocols like HTTP can be run between the two entities over the secure socket (HTTP over SSL is at times referred to as HTTPS for brevity).

Note that while SSL is described as an end to end protocol, the actual packets carrying the SSL traffic might go through many intermediate hops. e.g. in the classic case where TCP/IP is used as the transport the IP packets might traverse many different nodes. However, the intermediate nodes play no part in processing the SSL messages, and for them it is simply data being transported. Similarly, others have proposed or implemented SSL as a two entity protocol used over wireless, used over datagram services, used over the SOAP standard, etc. All these variations of SSL do not change the fundamental two entity end to end authentication and key exchange purpose of SSL, and the presence of intermediate points play no role in the processing of SSL. This work has no bearing on our invention, which will introduce an active man in the middle necessary for correct protocol functioning.

There have also been numerous implementations of what are sometimes referred to as 'SSL proxies'. Here there is a proxy or gateway between the end points. However, there is no longer one SSL connection between the end points. Rather, there is a SSL connection from one end point to the gateway, and then another SSL connection between the gateway and the other end point. This also has no bearing on our work, which is focused on a single SSL session with end to end security.

SSL can be used to perform three functions to secure a connection between Entity 1 and Entity 2:

1. Entity 1 (often a user at a browser) can authenticate Entity 2 (often a web service), if Entity 2 has a trusted digital certificate.
2. Provide for encrypted communication between Entity 1 and Entity 2.
3. Can optionally be used to authenticate Entity 1 to Entity 2 (mutual authentication), if Entity 1 has a trusted digital certificate.

In general when Entity 1 is a user at a browser, and Entity 2 is a web server, then only the first two steps are used. As an example, any user can visit the USPTO at http://sas.uspto.gov/ptosas/ and set up a HTTP over SSL connection. However, at that point, while the user has authenticated the USPTO web site (and has an encrypted session), the USPTO has not authenticated the user. For this to happen the user would need a digital certificate.

In practice it is easy for organizations/servers to possess digital certificates. For instance in the example above, the USPTO could have purchased the digital certificate it uses to secure its web site for literally less than ten dollars and have set it up in a few minutes. On the other hand, it has proven very difficult for individual users to obtain, carry and use certificates. As an example, the USPTO has a program to issuer customers with certificates. (see https://sas.uspto.gov/enroll/traditional-client-zf-create.html), and it can be easily seen that giving users certificates and managing them on an ongoing fashion is difficult and costly.

For these reasons, SSL is typically used to authenticate a web site (e.g. USPTO) to a user's browser, but not typically the other way around. The exception to this would be when SSL is used to secure server to server communication. As it is simple for both servers to be set up with digital certificates, in such cases SSL is often used with mutual authentication.

SSL works in two steps, first Entity 1 and Entity 2 perform a 'handshake' in the course of which the authentication and the key exchange for encryption are performed, and a variety of other parameters are exchanged. Once the 'handshake' is complete the two parties can communicate securely using a shared master_secret. As it is relevant to our future discussion, we will describe the SSL handshake (with mutual authentication). Our description is meant to convey the essence of the protocol, and is not meant to be a detailed description for which we refer the reader to the Internet standard.

Figure 1:
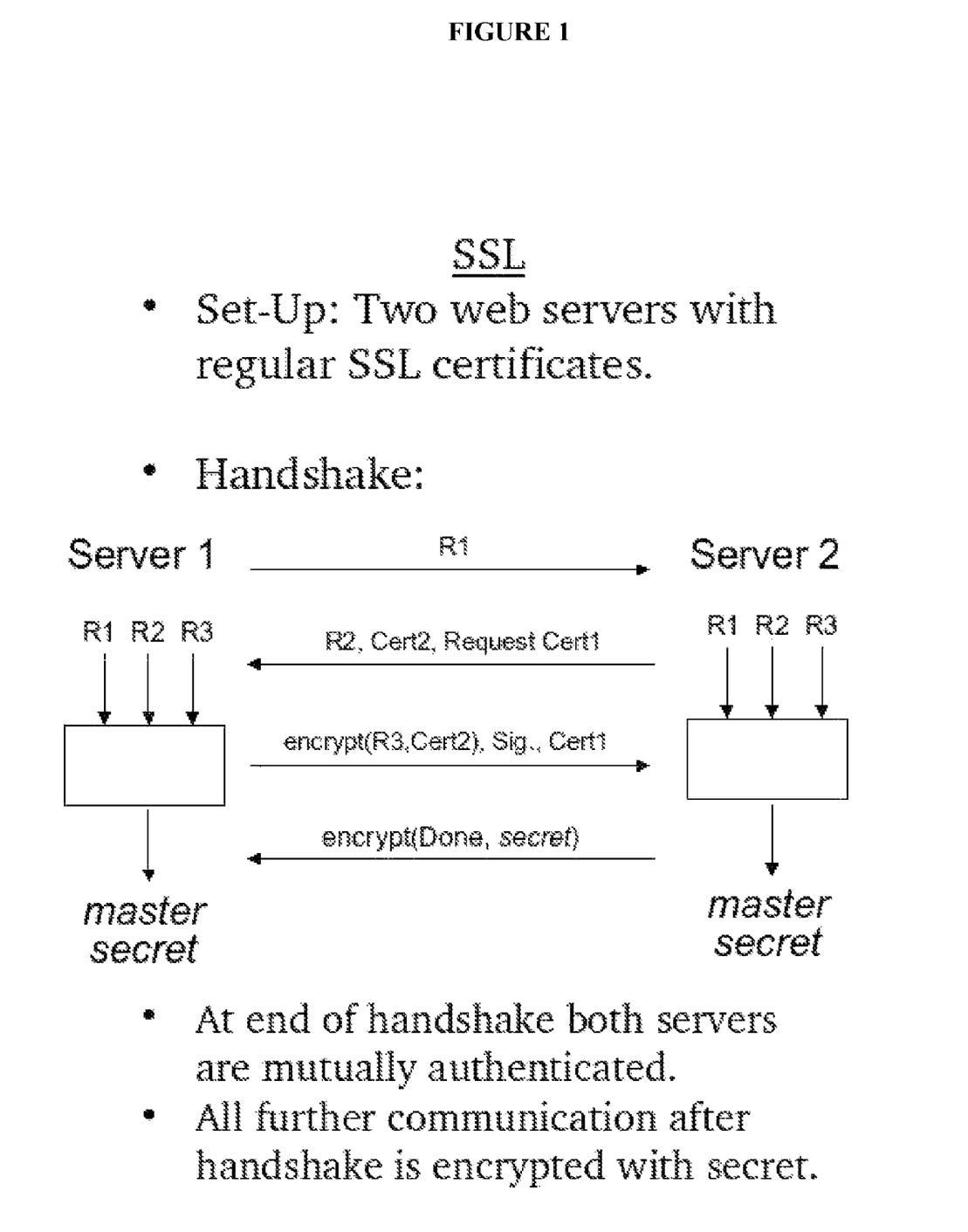
FIG. 1 depicts two servers conducting a standard SSL handshake.

FIG. 1 shows the standard SSL handshake. To begin with, it is assumed that both entities (referred to as Server 1 and Server 2 for convenience) have digital certificates issued by authorities the other party trusts. The protocol begins with a handshake mechanism which consists of four message exchanges:

SSL-Handshake-1 (aka CLIENT-HELLO) Server 1 sends a message to Server2 which among other things contains a random number, which we call R1. [R1]

SSL-Handshake-2 (aka SERVER-HELLO) Server 2 replies with another random number R2, its own digital certificate, and a request for mutual authentication (somewhat misleadingly called the Certificate-Request). [R2, Cert2, Request Cert1]

SSL-Handshake-3 (aka CLIENT-KEY-EXCHANGE) Server 1 verifies the authenticity of Server 2's certificate, and in the process extracts Server 2's public key. It then encrypts a third random number which we call R3 with this public key. It further signs a running_hash of all messages exchanged up to that point with its own private key. Server 1 then sends the encrypted R3, the signed running hash, and its own certificate to Server 2. [encrypt(R3,Cert2),Sign(running_hash,Cert1), Cert1]. Server 1 also combines R1, R2 and R3 to create a master_secret.

SSL-Handshake-4 (SERVER-FINISHED) On receiving the above message, Server 2 uses its own private key to recover R3 from the encrypted packet. It then verifies the authenticity of Cert1 and extracts Server1's public key, which it then uses to verify the signature on the running_hash. If the signature was valid, then at this point Server 2 has authenticated Server 1. It then combines R1, R2 and R3 to create the master_secret. Finally, it sends a message to Server 1 encrypted with the master_secret. encrypt(Done, master_secret). On receiving this message Server 1 will attempt to decrypt it using the master_secret it independently computed in Step 3. If the decryption is correct then Server 1 has authenticated Server2.

Both parties have now authenticated each other and share a secret the master_secret, which they can use for further communication with each other.

What we have described is the handshake with mutual authentication which assumes both parties have certificates. Often one side, typically a user at a browser, will not have a certificate, but the other side, e.g. the USPTO web site, will have a certificate. In this case the web site will not request mutual authentication, and the browser will not sign the running_hash. Otherwise the rest of the protocol remains the same. While this has some value, the MITM protection only comes into play when mutual authentication is used. This is why phishing has been widespread in spite of SSL being deployed widely.

In the event that two entities have previously exchanged a master_secret, which they have retained, the protocol provides a way for them to resume communications over a new transport, using the existing parameters. In this "abbreviated handshake":

The first handshake message from the first entity to the second entity contains the SessionID of the previous session.

If the second entity is willing and able to resume the previous session, the reply contains the same SessionID, and a message encrypted with the previous master_secret.

If the first entity successfully decrypts the message then it in effect authenticates the second entity. It then responds with its own message encrypted with the master_secret. The second entity can decrypt this message thus authenticating the first entity.

This allows the two entities to resume the session without having to perform any operations involving public key cryptography (which is resource intensive).

OBJECTIVES OF THE INVENTION

This invention has the following objectives:

Create a three entity protocol where all three entities are mutually authenticated and can communicate securely. While our invention applies generally, the specific use case of most interest is when the three entities are a user at a browser, communicating simultaneously to two web services.

Do so without creating a need for entirely new cryptographic protocols, new software, new standards, new trust infrastructures (e.g. certificate authorities to issue certificates). In other words, create a three party protocol that can reuse as a building block a very widely available security standard, namely SSL.

Do so in a fashion that minimizes to the furthest extent possible the actual changes to SSL processing, so as to retain and inherit the security properties and benefits of ubiquitous deployment that SSL has. While it would be far easier to meet the goals by introducing many arbitrary changes and extensions, it is much harder, but necessary, to devise a scheme that has maximal impact with minimal changes.

Do so in a fashion where only two of the entities require digital certificates, while the third (e.g. the user at the browser), can have a less cumbersome credential while retaining much of the security of digital certificates. (though we do not preclude the third entity from also using a digital certificate)

Do so in a fashion that allows two of the three entities to securely reuse keys from a previous run of the protocol with a different third entity to gain very significant performance benefits.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

As described earlier SSL is a two party transport level protocol, which was specifically designed to eliminate man in the middle attacks (when used with mutual authentication).

Our first innovation is to alter SSL to become a three party protocol, MashSSL, with an active man in the middle, whose actions are necessary for the correct functioning of the protocol. We cryptographically bind the two connections the man in the middle has with each end into a single secure connection.

Our second innovation is to introduce the concept of scrambling and unscrambling during the SSL handshake. Namely, as was seen above, the SSL mutual authentication and key exchange mechanism relies on a handshake based on four sets of message exchanges. We scramble the messages en route, and only successful unscrambling before processing will ensure correct SSL processing. We illustrate this concept with an example that shows one of the many ways this scrambling can proceed, in FIG. 2

Figure 2:
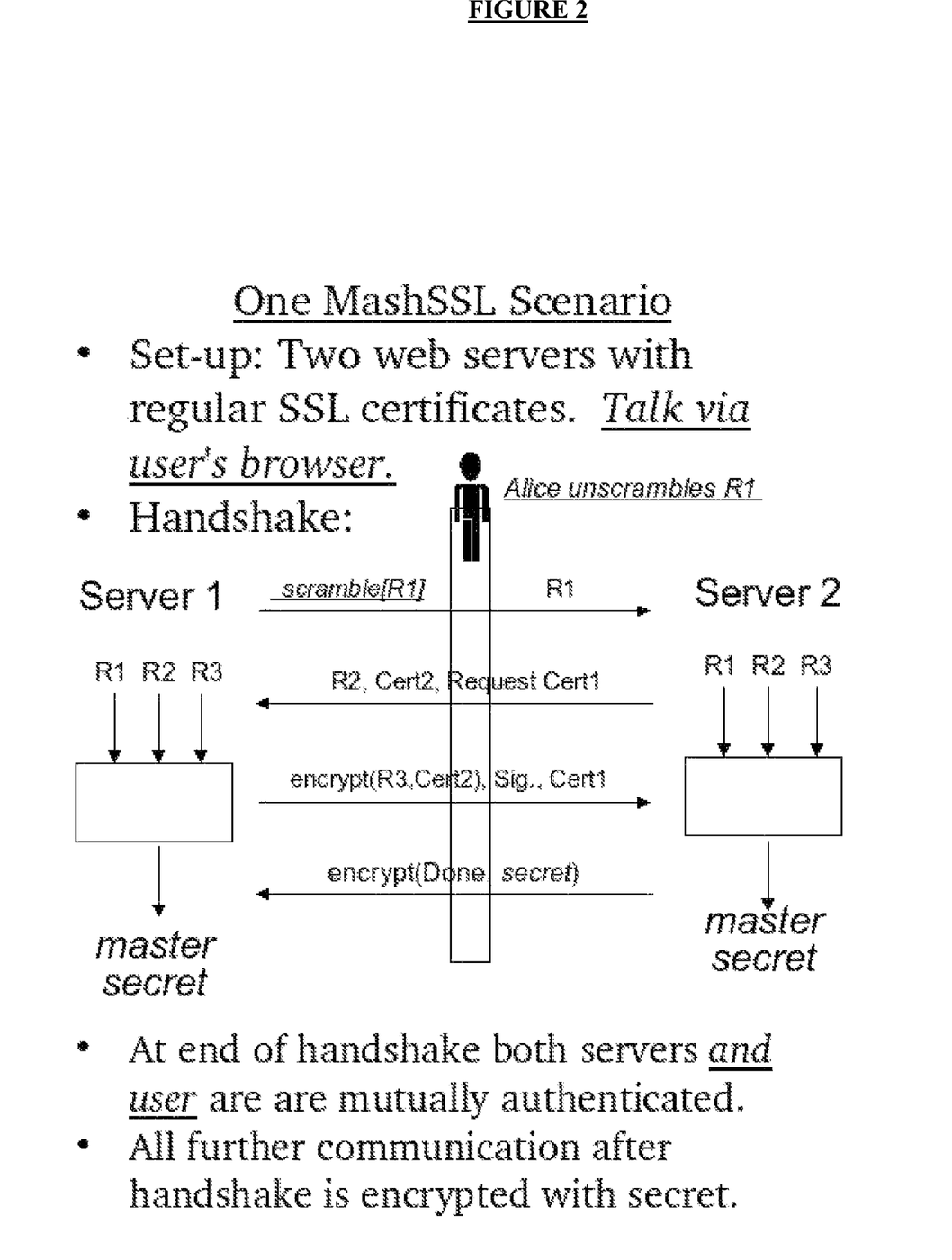
FIG. 2 depicts two servers conducting a MashSSL handshake using as an example, the scrambling of part of the first handshake message, in accordance with the present invention.

In this example, two web servers are communicating using HTTP via a user's browser which is ferrying the traffic back and forth. Server 1 scrambles the R1 in the first message in such a way that the user at the browser is required to unscramble it. Observe that if the unscrambling is not successful, then Server 2 will receive a random number which is different from R1. As both parties MUST use the same R1, R2 and R3 to generate the master_secret, the protocol will fail without the intervention of the man in the middle. If the handshake does complete successfully then Server 1 has authenticated the user and Server 2. Server 2 has authenticated Server 1, and knows that the user was authenticated by Server 1.

Our third innovation is to develop many variants of what messages are scrambled and when. Some of the variations (many others will be obvious to those skilled in the art) are:

- Instead of Server 1 scrambling R1, Server 2 scrambles R2 before sending to user.
- Server 1 scrambles R1 before sending to the user, AND, Server 2 scrambles R2 before sending to the user.
- Server 1 sends an unscrambled R1, but the user scrambles it before sending it to Server 2. Server 2 must unscramble it successfully before processing.
- Server 1 sends a scrambled R1 to the user. The user unscrambles it, but re-scrambles it before sending it on to Server 2.
- Different parts of the SSL handshake instead of R1 and R2 are scrambled and unscrambled.
- Several of the above techniques can be combined and even layered.

These myriad combinations result in protocols with very different security properties that can be used in different contexts, but all retain the same underlying scrambling/unscrambling methodology.

Our fourth innovation is in allowing the above system to be used with almost any form of scrambling and unscrambling, including the use of existing authentication credentials. For instance, in the example we showed above, the scrambling may be achieved by encrypting R1 with the user's password. Only the legitimate user who knows the password can unscramble (decrypt) R1 correctly. The sort of credentials can include passwords, PKI, smart cards, token authenticators, SMS, out of band phone systems, etc.

Our fifth innovation provides for significant processing efficiency. As was noted above, the two party transport level SSL protocol allows for the parameters agreed to as part of a handshake to be reused using an 'abbreviated handshake'. In this abbreviated handshake the two parties simply prove to the other that they have knowledge of the prior master_secret. In MashSSL we extend this reuse across different second entities. This is to account for the scenario where two web services may often be cooperating using MashSSL for different end users. In our novel extension of this reuse facility the scrambling/unscrambling parameters are unique to each three-entity session, each with a unique man in the middle, but the master secret is used by the two end entities to authenticate each other. For instance assume the protocol is first run between Bank ABC, User Alice and Brokerage XYZ. Subsequently it is run between Bank ABC, User Bob and Brokerage XYZ. Now it is advantageous for Bank ABC and Brokerage XYZ to reuse the old master_secret for performance improvements, but they need to authenticate the new entity in the middle, and would not want to make available to one user any secrets used during a run of the protocol for a different user. This can be achieved by changing R1/R2 and the scrambling/unscrambling parameters, but retaining the same master_secret.

Our sixth innovation is to allow end points who have established a MashSSL connection and established a master-secret via a user to now use those parameters to establish a connection directly between themselves.

Extending this three party protocol to four or more parties to make it a multi-party protocol is a straightforward application of these innovations which will be obvious to anyone skilled in the art.

PREFERRED EMBODIMENT(S) OF THE INVENTION

The set up for our preferred embodiment is as follows:
A User at a web browser. The user shares different authentication credentials with two web services.
The first web service is called the Client (in keeping with SSL terminology) and has a digital certificate
The second web service is called the Server and also has a digital certificate.

We will describe the interactions by presenting the messages that are exchanged, and explaining how they are processed. Each message contains two portions, the first indicating the portion of the message that is taken from the original SSL protocol and the second the MashSSL additions. Note however, that the scrambling is happening to parts of the SSL message.

Figure 3:
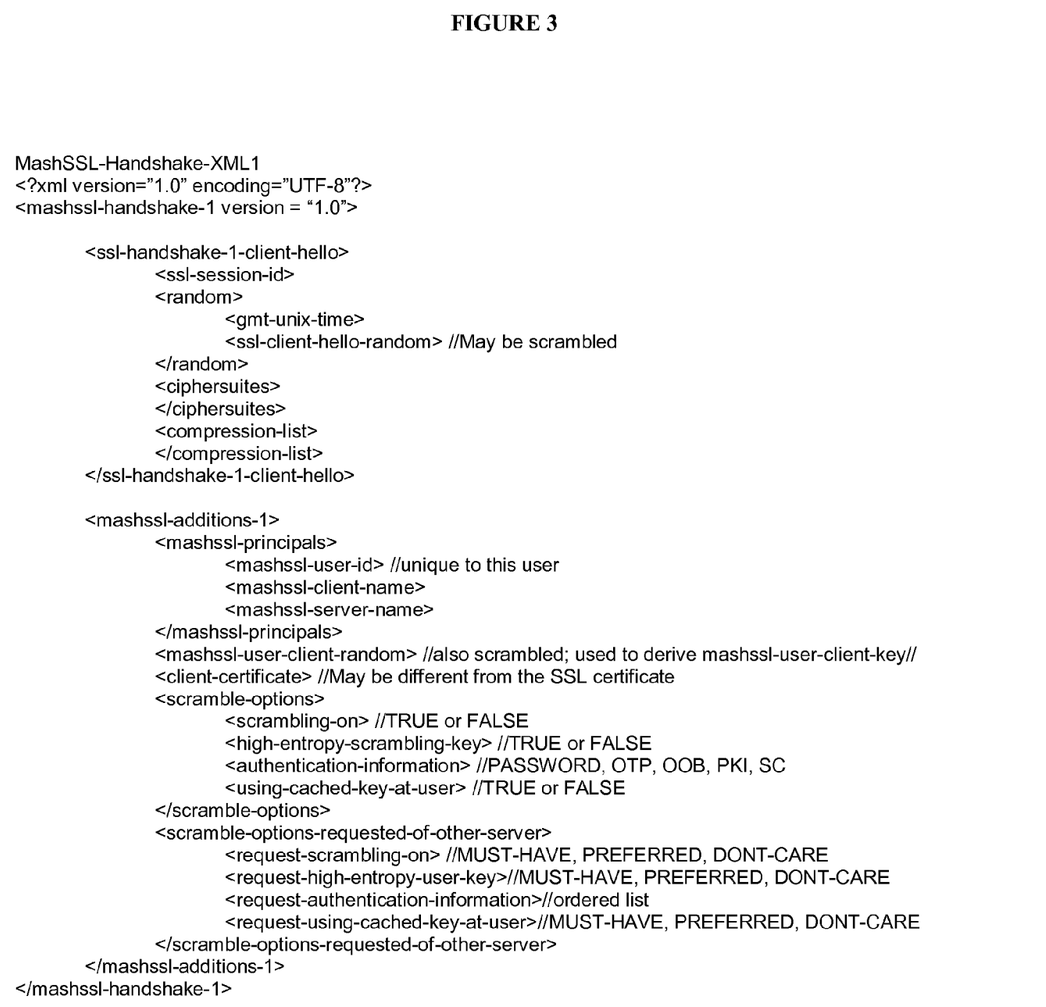
FIG. 3 depicts the first MashSSL XML handshake message sent in the preferred embodiment, in accordance with the present invention.

The MashSSL part of the interaction starts with the Client sending the User MashSSL-Handshake-XML1 as shown in FIG. 3. The message consists of the traditional SSL parameters, and MashSSL specific information. The latter explicitly has information on whether the Client has scrambled the message, and if so how they have done it. It also has options requested of the Server in how the Client would like the Server to handle the scrambling between the Server and the User. If the Client has chosen to scramble there are two main variants:

- The scrambling is with a high-entropy key which is not vulnerable to dictionary attacks. In this case the 'tag' <ssl-client-hellp-random> and the actual random number that follows it, are both scrambled. This way a legitimate user will know when the unscrambling is successful as it will see the tag.
- If however the scrambling is with a low entropy key (e.g. a weak password), then only the random part is scrambled, so that the attacker who is guessing passwords will not know when they have succeeded. In this case the random number, after unscrambling, will come back to the Client (encrypted with its public key) so that it can verify that unscrambling happened correctly.

Upon receiving this message the User will, if scrambling is turned on, unscramble the message using their credential with the Client. The user also unscrambles the mashssl-user-client-random random number, which the Client and the User can use to communicate securely. Observe that the Server need not be given this key.

Figure 4:
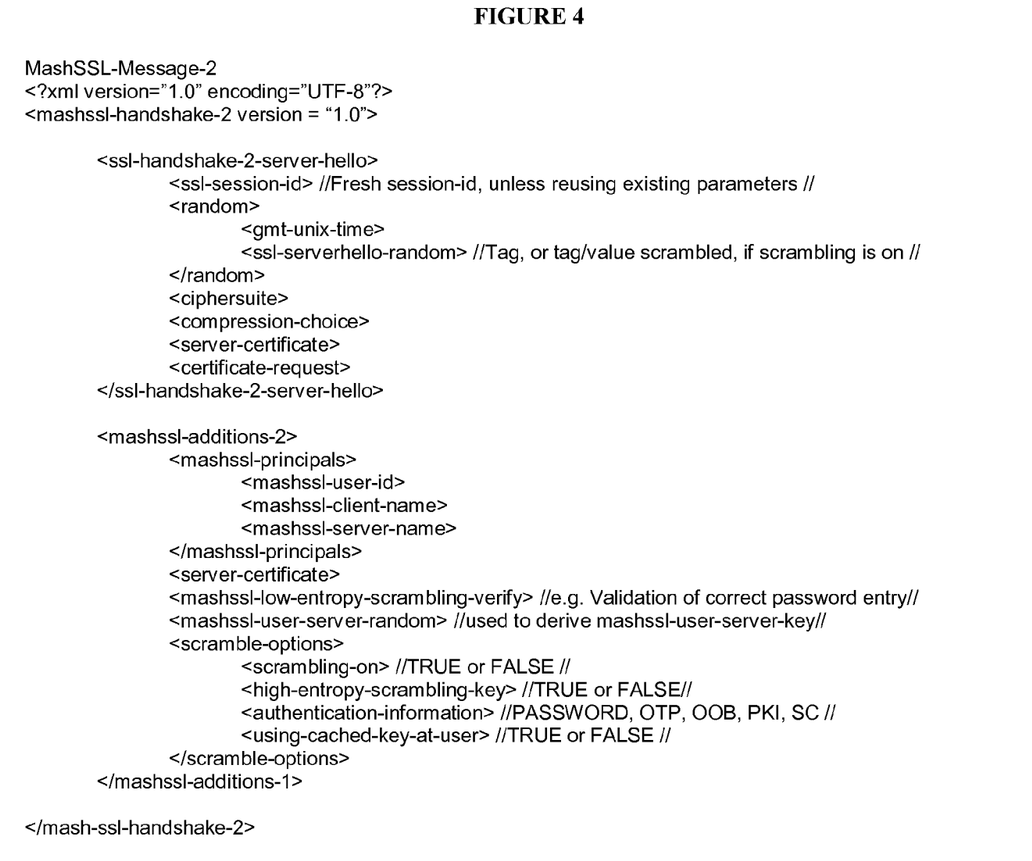
FIG. 4 depicts the second MashSSL XML handshake message sent in the preferred embodiment, in accordance with the present invention.

After unscrambling (or directly if the message did not involve scrambling), the User will pass the message on to the Server. The Server will examine the message, and if the various parameters are acceptable and it is in a position to participate in the connection, will reply to the User with the MashSSL-Handshake-2 as shown in FIG. 4.

The User will once again examine this message for scrambling, and if it is scrambled, will proceed to unscramble it. The user also unscrambles the mashssl-user-server-random random number, which the Server and the User can use to communicate securely. Observe that the Server need not be given this key.

Figure 5:
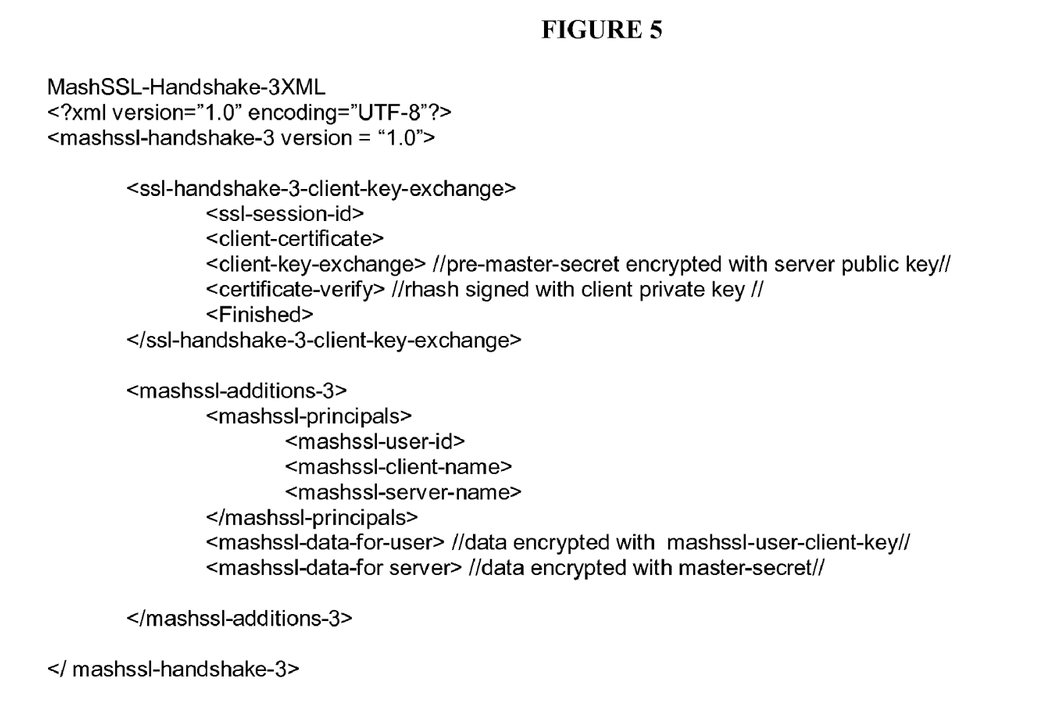
FIG. 5 depicts the third MashSSL XML handshake message sent in the preferred embodiment, in accordance with the present invention.

After unscrambling, the User will pass on the message to the Client. At this point the Client and the Server have successfully exchanged the first two random numbers. The Client computes the appropriate SSL responses and then proceeds to send the User MashSSL-Handshake-3XML to the User, as shown in FIG. 5.

The user strips this message of the <mashssl-data-for-user> tag and value which could contain data destined for the User. The rest of the message is passed on to the Server.

Figure 6:
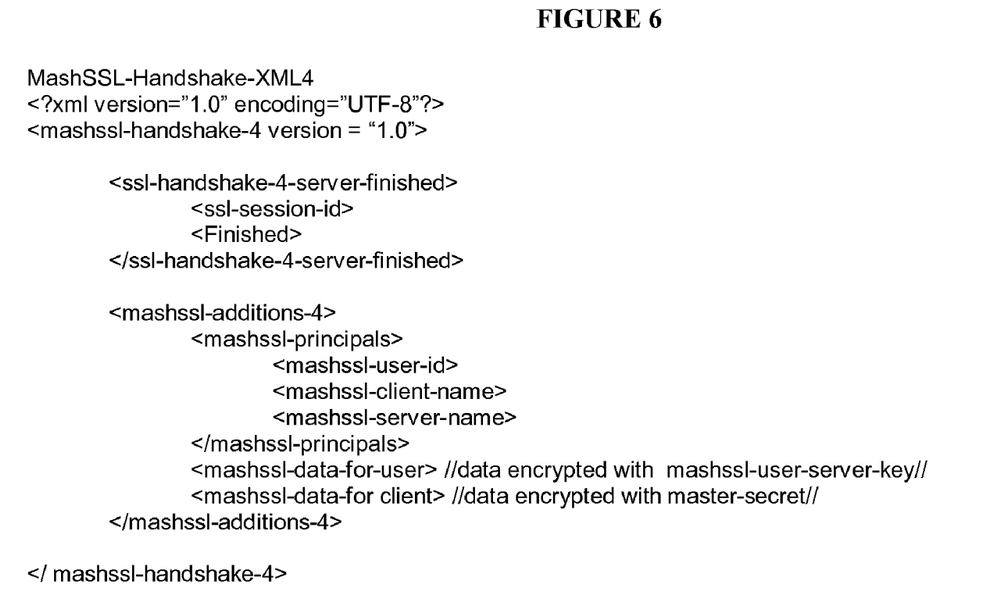
FIG. 6 depicts the fourth MashSSL XML handshake message sent in the preferred embodiment, in accordance with the present invention.

This message, which includes the Client's signature, authenticates the Client to the Server, and also sends the Server a pre-master-secret, from which the Client and the Server can both derive the master-secret. Observe that the User has no way of computing this master-secret. The Server then replies to the User with the MashSSL-Handshake-XML4 as shown in FIG. 6.

The User strips this message of the <mashssl-data-for User> tag and associated value, and sends on to the Client. The Client on successfully verifying the Finished message in the SSL part of the handshake has authenticated the Server. At the conclusion of the protocol all three parties have either explicitly or implicitly authenticated each other. The only exception to this case would be if neither the Client nor the Server requests scrambling, in which case the User remains unauthenticated. The User shares (different) keys with the Client and the Server for communication, and the Client and the Server share the master-secret.

Figure 7:
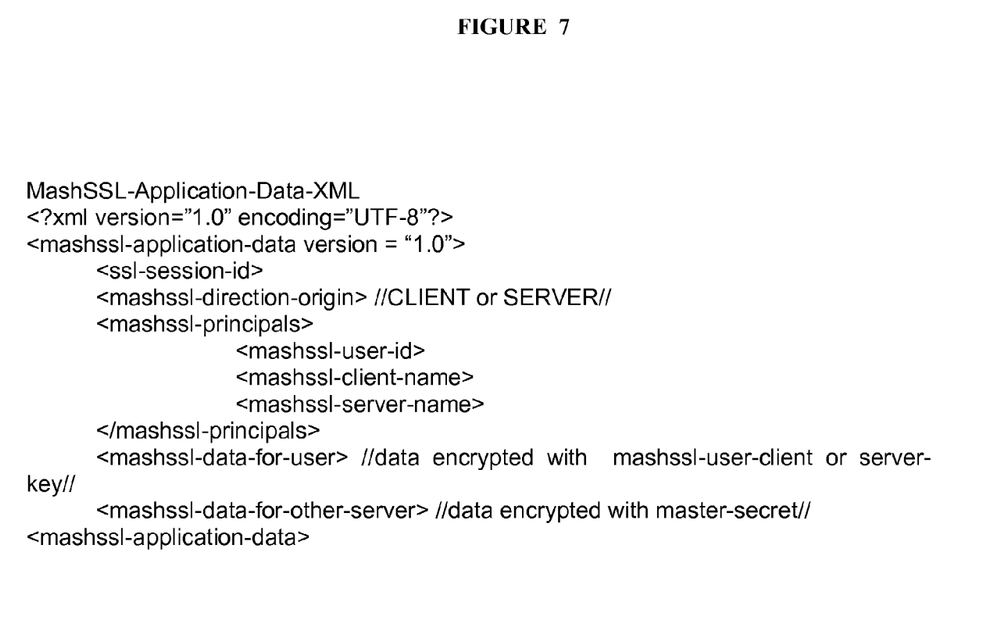
FIG. 7 depicts the MashSSL XML application data message sent in the preferred embodiment, in accordance with the present invention.

Communications can continue between the Client, the User and the Server, using the MashSSL-Application-Data-XML message (alternately the Client and the Server can now agree to use the parameters they just established to directly communicate), as shown in FIG. 7.

Now if a different user visits the same Client web service and causes the Client to decide to establish a MashSSL session with the same Server web service, the Client and the Server can take advantage of the fact that they already share parameters from the previous MashSSL session.

The first message from the Client to the New User to the Server is the same as the MashSSL-Handshake-XML1 message, as shown in FIG. 3, except that the <ssl-session-id> value is the same as the value agreed on during the previous session. Further, the random value in the <ssl-client-hello-random> tag is DIFFERENT from any used before. And the scrambling aspects remain the same.

Figure 8:
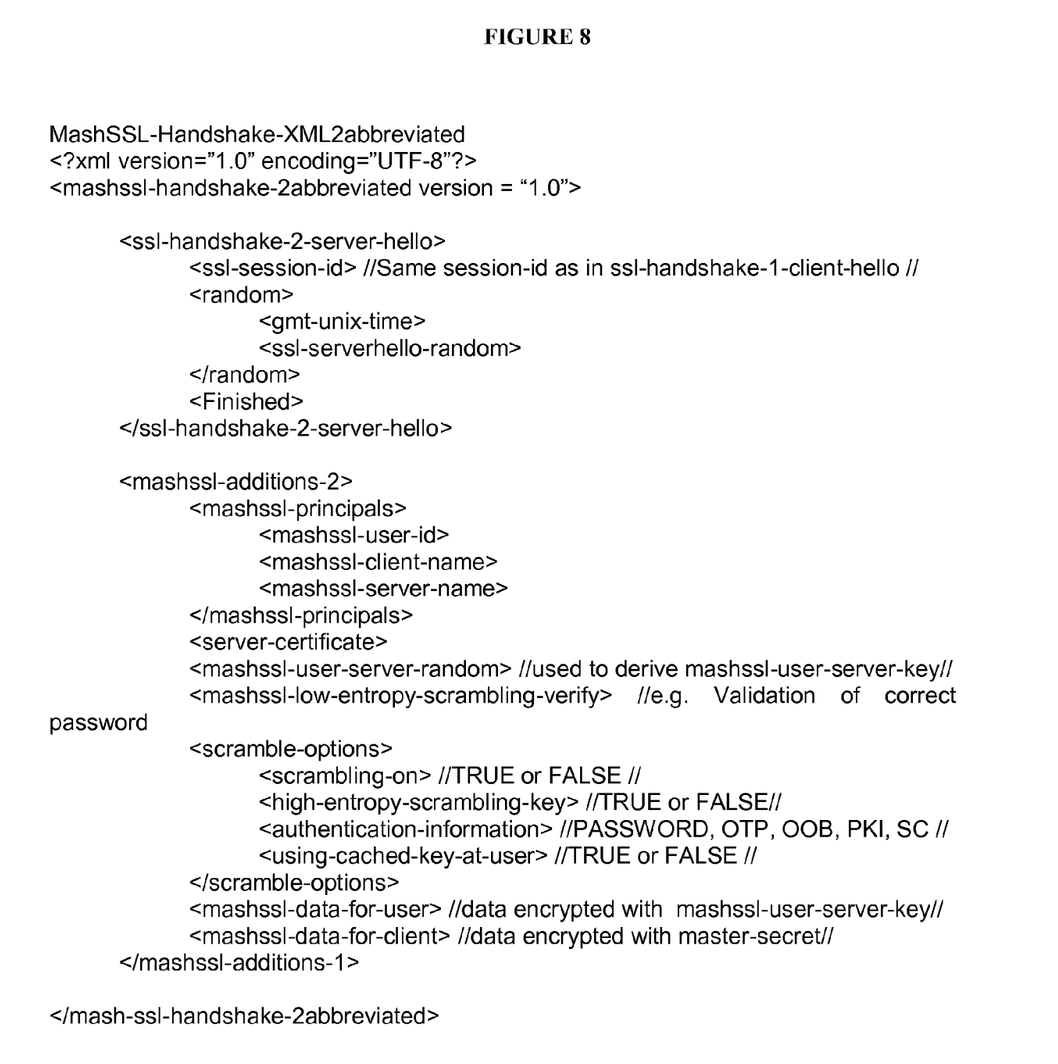
FIG. 8 depicts the abbreviated XML message sent in place of the second handshake message when reuse of parameters has been requested in the preferred embodiment, in accordance with the present invention.

If the Server is willing and able to reuse those parameters, than the Server responds via the user with an MashSSL-Handshake-XML2abbreviated message, as shown in FIG. 8. Again, the <ssl-serverhello-random> value is DIFFERENT, and the scrambling aspects remain the same.

Figure 9:
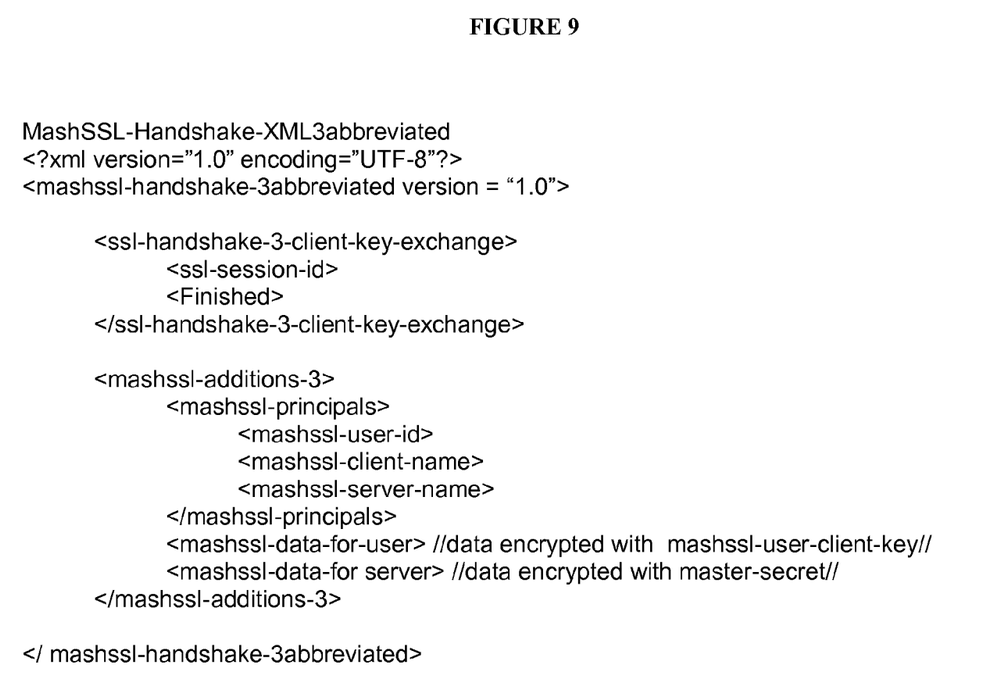
FIG. 9 depicts the abbreviated XML message sent in place of the third handshake message when reuse of parameters has been requested in the preferred embodiment, in accordance with the present invention.

The Client validates (using the Finished message) that the Server is in possession of the correct master-secret, and replies with MashSSL-Handshake-XML3abbreviated, as shown in FIG. 9.

The Server uses the Finished message to validate that the Client was indeed in possession of the master-secret. The Client and the User and the Server can now communicate further using the MashSSL-Application-Data-XML message. Note that the mashssl-user-client-key and mashssl-server-client-key will be unique to this session.

This approach of reusing parameters allows the Client and the Server to literally establish millions of MashSSL sessions without having to reestablish parameters. This is a huge performance benefit for major web services that have to frequently communicate on behalf of different users.F

What is claimed is:
1. A method for mutual authentication and key exchange between three entities, the method comprising:
configuring a processor to perform the steps of:
(a) the first entity sending the SSL Client-Hello handshake message including at least a first random number R1 to the third entity, via a second entity, wherein the first entity has authenticated the second entity;
(b) the third entity replying with the SSL Server-Hello handshake message including at least a second random number R2 to the first entity, via the second entity, wherein the third entity has authenticated the second entity;
(c) the first entity replying with the SSL Client-Key-Exchange handshake message including at least a third random number R3 to the third entity, via the second entity, wherein the first entity has authenticated the second entity;
(d) the third entity replying with the SSL Server-Finished handshake message to the first entity, via the second entity being authenticated before;

(e) the first entity and the third entity use the information in the handshake messages to derive said master-secret according to the SSL protocol, where said master-secret is not known to the second entity and can be used by the first and the third entities to authenticate each other; and (f) the first entity and the third entity can communicate securely using the master-secret so derived from the random numbers R1, R2 and R3, wherein said derived master secret can be subsequently reused for a different second entity between said first and said third entities.

2. A method for mutual authentication and key exchange between three entities according to claim 1, wherein additional data are sent in some or all of the messages in addition to the SSL handshake messages.

3. A method for mutual authentication and key exchange between three entities according to claim 2, wherein the additional data parameters in the handshake messages are used by (a) the first entity and the second entity to agree on a shared-secret not known to the third entity by the end of the handshake messages; and (b) the third entity and the second entity agreeing on a shared-secret not known to the first entity by the end of the handshake messages.

4. A method for mutual authentication and key exchange between three entities according to claim 3, wherein the three entities can send messages to each other encrypted with one of the shared secrets such that only the other entities who have that shared secret can decrypt the message.

5. A method for mutual authentication and key exchange between three entities according to claim 1, wherein scrambling of any of the handshake messages is done by the second entity and the unscrambling is done by the first entity or third entity.

6. A method for mutual authentication and key exchange between three entities according to claim 1, wherein the first or third entity can send the second entity a scrambled message; the second entity unscrambles the message, and then re-scrambles the message before sending it on, and the final recipient unscrambles the message.

7. A method for mutual authentication and key exchange between three entities according to claim 1, wherein scrambling and unscrambling of the messages is carried out using symmetric encryption or assymetric encryption or hashing or keyed hashing or other similar cryptographic functions.

8. A method for mutual authentication and key exchange between three entities according to claim 1, wherein scrambling and unscrambling of the messages is carried out using keys derived from authentication credentials such as passwords, one time passwords, digital certificates, smartcards, biometrics, out of band authentication, or any other authentication credential.

9. A method for mutual authentication and key exchange between three entities according to claim 1, wherein the first entity and the third entity can reuse the master secret established during communications via a different second entity, during communications with said third entity.

10. A method for mutual authentication and key exchange between three entities according to claim 1, wherein the first entity and the third entity can reuse a shared secret established during communications via a third entity, to establish a secure direct communication between them, which does not go via the third entity.

11. A method for mutual authentication and key exchange between three entities according to claim 1, wherein additional data providing parameters for MashSSL are sent in all messages in addition to the SSL handshake messages.

12. A method for mutual authentication and key exchange between three entities according to claim 1, wherein the authentication of the first entity and third entity can be performed using their SSL digital certificates.

13. A method for mutual authentication and key exchange between three entities according to claim 1, wherein there are more than three entities participating.

\* \* \* \* \*